United States Patent Office 3,398,086
Patented Aug. 20, 1968

3,398,086
PROCESS FOR TREATING HYDROCARBON DISTILLATES CONTAINING MERCAPTAN AND COLOR-FORMING COMPONENTS
Robert H. Rosenwald, Western Springs, and Peter Urban, Northbrook, Ill., assignors to Universal Oil Products Company, Des Plaines, Ill., a corporation of Delaware
No Drawing. Filed Mar. 23, 1966, Ser. No. 543,458
10 Claims. (Cl. 208—206)

ABSTRACT OF THE DISCLOSURE

Sour hydrocarbon fractions are treated initially with an aromatic diazonium salt to convert color-forming components in the hydrocarbons into azo compounds, and the treated fractions are then reacted with an oxidizing agent to convert mercaptan components into disulfides. The initial treatment removes phenolic components from the hydrocarbons thus preventing color depreciation during the oxidation step.

---

This invention relates to a novel combination process for treating a sour organic stream containing phenolic and mercaptan components in order to recover a product of reduced mercaptan content and of acceptable color. More succinctly, this invention involves a novel combination process for the treatment of a sour organic stream, which combination process utilizes a diazonium compound in a pretreating step to transform objectionable components within the sour organic stream into harmless and easily separable derivatives, such that a subsequent mercaptan oxidation step will not trigger undesired side reactions of these objectionable components that cause production of unwanted colored compounds, and such that, in one particularly preferred catalytic oxidation step, the objectionable components will not have a marked detrimental effect on catalytic activity. In essence then, this invention involves recognition that certain azo-compound forming components—chief among these is the class of phenolic compounds—can have a pronounced effect on the color characteristics of a sour organic stream that is subsequently treated by one of the traditional mercaptan oxidizing procedures. And this recognition facilitated the formulation of a solution which comprehends utilization of diazonium compounds to couple with the undesired components of the sour organic stream in order that they may be rendered insensitive to the subsequent oxidation step, or more preferably, that they may be easily separated from the sour organic stream prior to the oxidation step.

Since the days of kerosene lamps, the petroleum industry has been faced with the requirement of producing certain classes of products that have preferred color characteristics. In general, the type of color that is desired is the so-called "water white" color that, as its name implies, is perhaps best characterized by reference to the color of clear water. This, in turn, implies that really what is desired is the absence of color or, equivalently, the absence of colored components. Just why this color requirement is imposed on the industry is somewhat difficult to explain because there is no doubt that the presence of some color in a hydrocarbon fraction, for example kerosene, does not harm its burning characteristics; nevertheless, the traditions of the market place dictate that certain hydrocarbon fractions will command a greater price if they are not colored.

In the resolution of another problem associated with the production of these hydrocarbon fractions—the problem of acceptable mercaptan content—it has been observed that the color problem is not only dependent on the mercaptan removing means, but in fact, the color problem is intensified by such subsequent mercaptan oxidation step. As will be shown in an example such oxidation treatment of a kerosene having an initial Saybolt color of 30, can result in a treated kerosene having a Saybolt color of about 0. Thus it has been found that the traditional means for sweetening a hydrocarbon, via an oxidation reaction of the mercaptans to disulfides, intensifies the color problem, and indeed, creates a substantial need for a sweetening process that does not cause this depreciation of color characteristics.

During the course of our investigation of this color intensification phenomenon, we have observed that the presence of phenolic components during the sweetening process can contribute to this marked degradation of color characteristics. By phenolic components it is meant in general, unsubstituted or substituted aromatic hydrocarbons that are activated by one or more hydroxyl groups, such as: phenol, the cresols, the amino phenols, the xylenols, the nitrophenols, the phenol sulfonic acids, the halogenated phenols, the alkyl substituted phenols, the naphthols, the hydroxyl heterocyclic compounds, etc.

This observation resulted in the investigation of various procedures to pretreat the charge to a mercaptan oxidizing step in order to remove phenolic compounds. One of the procedures that was considered is the pretreatment of the charge with a diazonium compound at coupling conditions. When this procedure is performed, as will be shown in the examples, a marked improvement in color characteristics of the resultant product is noted. Thus, the present invention simultaneously solves the mercaptan removal and color degradation problem by the utilization of a process that involves pretreatment of the sour organic stream with a diazonium compound, followed by a mercaptan oxidation step.

It is to be carefully noted that several other solutions to the color degradation problem have been proposed; but these, in the main, involve the utilization of a post sweetening step to remove the colored bodies by reducing them back to their colorless precursors, usually by means of adding a reducing agent such as sodium hydrosulfite. This procedure involves a substantial risk of also reducing some disulfides back to mercaptans thus jeopardizing the results of the sweetening step of the process. The present invention circumvents this whole problem by the simple expediency of removing the color forming materials prior to the oxidation step.

Also, during the course of examining the sweetening of a substantial phenolic - component - free hydrocarbon stream, we found that for the special case in which the oxidation of the mercaptan was accomplished in the presence of a phthalocyanine catalyst, that a marked improvement in catalyst activity was experienced. Without unduly restricting our invention by this explanation, we attribute this increase in activity to the absence of the surface active phenolic components. Apparently, when these surface-active phenolic components are present they are attracted to the surface of the phthalocyanine catalyst where their presence constitutes a barrier to the approach of the mercaptide anion which we believe is an essential step in the oxidation process.

Therefore, it is a principal object of the present invention to provide a combination process for the sweetening of a sour organic stream with no attendant color degradation. A corollary objective for the special case where the sweetening process involves the utilization of a metal phthalocyanine catalyst, is the achievement of a high level of catalyst activity for an extended period of time.

In a broad embodiment, therefore, the present invention involves a combination process for treating a sour organic stream containing mercaptan and color forming components in order to generate a product of reduced mercaptan content and of acceptable color, which process comprises the steps of: treating said sour organic stream with a diazonium compound at coupling conditions effecting the conversion of a substantial portion of the color forming component of said sour organic stream into a separable azo compound; and contacting the resultant substantially color-forming-component-free sour organic stream with an oxidizing agent at process conditions selected to convert at least a portion of said mercaptan component into disulfide.

Still another broad embodiment relates to a combination process for treating a sour hydrocarbon fraction containing mercaptan and phenolic components in order to recover a product of reduced mercaptan content and of acceptable color, which process comprises the steps of: treating said sour hydrocarbon fraction with a diazonium compound in an alkaline solution at coupling conditions effecting the conversion of a substantial portion of the phenolic component of said sour hydrocarbon fraction into alkali-soluble azo compound; separating said alkali-soluble azo compound from said sour hydrocarbon fraction to provide a substantially phenolic-component-free hydrocarbon phase and an azo-compound-containing alkali phase; contacting said substantially phenolic-component-free hydrocarbon phase with an oxidation agent and with a phthalocyanine catalyst at oxidizing conditions selected to convert at least a portion of the mercaptan component of said phenolic-component-free hydrocarbon phase into disulfide.

Specific embodiments of this invention relate to particular preferred process conditions and mechanisms of effecting the process steps. These will be hereinafter discussed in a detailed explanation of the invention which is contained in the description of the elements, conditions and mechanisms that can be employed in the practice of each step of the present invention.

The inventive concept herein discussed stems primarily from the recognition that, in a sweetening process, the observed color degradation of the hydrocarbon stream is caused by the presence of small quantities of undesired materials which, during the course of the mercaptan oxidation step, are also oxidized to highly colored complex molecules. For instance, it is believed that the polyalkylphenols contained in the sour organic stream are oxidized to quinones which are highly colored compounds. Accordingly, in order to prevent the color degradation of the sweetened product, it is important to remove these potential colored compound forming materials prior to the mercaptan oxidation step. The method herein proposed to accomplish this removal involves a coupling reaction of the diazonium compound with the colored compound forming materials contained within the sour organic stream to yield easily separable azo compounds.

Before considering each of the elements and mechanisms of the process steps that comprise the various embodiments of the present invention, it is convenient to define several of the terms and phrases employed within the specification and the appended claims. In those instances where temperatures are given with respect to initial boiling points, boiling ranges, and end boiling points, it is understood that they have reference to those which are obtained through use of Standard ASTM Distillation methods. The phrase "gasoline boiling range" refers to a temperature range having an upper limit of about 400° F. to about 425° F. The term "middle distillate range" is intended to refer to temperatures above the gasoline range but having an upper limit of about 650° F.—included here would be hydrocarbon fractions that are called in the industry: heavy naphthas, fuel oils, jet fuels, etc. The term "kerosene" would also be a special case of a middle distillate range oil having an initial boiling point of 300° F. to about 400° F. and an end boiling point of about 475° F. to about 550° F. The term "sweetening" as used herein denotes the process of treating a sour hydrocarbon fraction with an oxidizing agent at conditions designed to effect the oxidation of mercaptans essentially to disulfides, which are compounds of a comparatively sweet odor. By the term "Saybolt color" is meant the reading obtained by utilization of the Saybolt scale which ranges from about 30 for water white fluids, to about 15 for slightly yellow fluids, to 0 and below for darkly colored (usually yellow) fluids. The term "acceptable color" is intended to refer to a reading which is above about 20 on the Saybolt scale. The term "hydrocarbon fraction or distillate" is intended to refer to a portion of a petroleum crude oil, of a mixture of hydrocarbons, of a shale oil, of a coal tar distillate, etc., that boils within a given temperature range. The term "copper chloride sweetening" refers to the process of utilizing cupric chloride to oxidize mercaptans to disulfides in hydrocarbon fractions. The term "doctor sweeteing" refers to the treatment of hydrocarbon fractions with an aqueous solution of sodium plumbite, sodium hydroxide, and sulfur.

The formulas associated with the various generic terms used for the classes of organic compounds mentioned in the specification and claims are as follows: (1) mercaptan, R—SH; (2) mercaptide, R—SM; (3) disulfide, R—S—S—R; (4) diazonium salt, AR—N—N—X; and (5) azo compound, AR—N—N—AR; and the symbols have the following significance: R is an aliphatic or aromatic hydrocarbon radical, S is sulfur, N is nitrogen, H is hydrogen, M is any metal cation, X is an anion and particularly the conjugate base of a strong acid, and AR is any substituted or unsubstituted aromatic hydrocarbon.

The various elements, process conditions, and mechanisms that enter into the process of the present invention can be understood by reference to the following process-step-oriented discussions in which the input streams, the catalytic and/or reactive components, the necessary concentrations of critical materials, the effective process conditions, and the mechanisms of effecting, are given for each step of a general embodiment of the present invention and amplified for selected areas of a preferred embodiment.

The input sour organic stream for the process of the present invention can be any stream in which mercaptan compounds are present and in which it is desired to effect the conversion thereof to disulfides without triggering color degrading side reactions. For example, the input stream may be one prepared by the synthesis of mercaptans from a reaction involving an alkylhalide and an alcoholic solution of sodium hydrosulfide that contains trace quantities of phenols. Usually, however, the input stream will be a hydrocarbon fraction or distillate. This may include normally gaseous hydrocarbons, gasoline, naphthas, gas oils, etc.; but it more frequently will be a middle distillate range oil such as kerosene, jet fuel, stove oil, range oils, burner oils, gas oil, fuel oils, etc.

The diazonium compound employed in the coupling reaction step of the present invention may be a substituted or unsubstituted aromatic diazonium salt. Typical examples of this class are: benzenediazonium salts, halogenated benzenediazonium salts such as p-chlorobenzenediazonium salts, nitrated benezenediazonium salts such as p-nitrobenzenediazonium salts, sulfonated benzenediazonium salts such as diazotized sulfanilic acid salt, alkylated benzenediazonium salt such as p-methyl benzenediazonium salts or 2,4-dimethylbenzenediazonium salts, halogenated naphthalene-diazonium salts such as 1-chloro-8-naphthalenediazonium salts, etc. Such salts will include the following: the chloride, the bromide, the fluoride, the sulfate, the acid sulfate, the nitrate, the carbonate, the fluoroborate, the carboxylates, the sulfonates, etc. From the foregoing it can be seen that a number of different diazonium compounds can be used in the practice of the present invention. However, it is understood that all of the diazonium compounds are not necessarily of equivalent activity in coupling with the phenolic components in the input stream. A particularly preferred diazonium compound is diazotized sulfanilic acid salt.

Treatment of the sour organic inputstream containing phenolic components with the diazonium compound is preferably effected in the presence of an alkaline reagent. Any suitable alkaline reagent may be employed. A preferred reagent comprises an aqueous solution of an alkali metal hydroxide such as sodium hydroxide, potassium hydroxide, etc. Other alkaline solutions include aqueous solutions of lithium hydroxide, cesium hydroxide, etc. In general these latter hydroxides are more expensive and therefore generally are not preferred for commercial use. Preferred alkaline solutions are aqueous solutions of from about 1% to about 50% and more preferably 5% to about 25% by weight concentration of sodium hydroxide or potassium hydroxide. While water is the preferred solvent, it is understood that other suitable solvents may be used including for example alcohol, ketone, etc.

The coupling step of the process is performed in any appropriate manner and may be batch or continuous. In a typical batch operation, the sour organic input stream, the diazonium compound, and the alkaline solution are supplied to a reaction vessel equipped with mixing blades or other suitable stirring means which provide intimate mixing of the reactants. In a typical continuous type operation, the sour organic input stream, the diazonium compound, and the alkaline solution are passed either countercurrently or concurrently into a suitable vessel. The vessel preferably is provided with suitable contacting means including side to side pans, bubble decks, bubble trays, perforated plates, a fixed bed of inert packing material; etc.

The coupling step is conducted at process conditions which include: (1) a temperature ranging between about 0° F. up to about 100° F. and preferably about 30° F. to about 60° F.; (2) a pressure within the range of atmospheric to about 100 p.s.i.g., but preferably at atmospheric pressure; and (3) a contact time that ranges from about 0.1 minute to about 30 minutes and is preferably in the range of about 1 minute to about 10 minutes.

The required concentration of the diazonium compound is, patently, a pronounced function of the concentration of the phenolic compounds and of other materials capable of undergoing the coupling reaction. For economic reasons it is preferred to use the diazonium compound in as small a concentration as possible. Therefore, the concentration used will generally be within the range of from about .0001% to about 1.0% by weight of the sour organic stream, the precise amount being a function of the concentration of the coupling compounds in the sour organic stream and/or the color of the resultant product.

Following the coupling step, it is preferred that the reaction mixture be separated into a hydrocarbon phase and an alkali phase. This separation facilitates the removal of the azo compounds formed during the coupling step, since they, as obtained with selected diazonium salts, are insoluble in the organic phase and highly soluble in the alkaline phase. This separation may take place in the original zone of treatment or in a different zone. It is to be noted that, for our purposes, it is not absolutely necessary to separate the reaction mixture after the coupling step, since the color forming materials, that have been transformed into azo compounds, are not harmful to the sweetening step of the present invention; and thus, in another embodiment, it is possible to separate them after the sweetening step.

The final step in the process is the sweetening step. Any suitable sweetening process may be utilized. Some of the alternatives here are as follows: (1) the conventional doctor sweetening process in which the hydrocarbon distillate is treated with doctor solution (a solution of lead oxide in sodium hydroxide—called sodium plumbite) and sulfur; (2) the copper chloride treating process from which the oxidizing powers of cupric chloride is utilized to convert mercaptans into disulfides; (3) the phthalocyanine catalyzed treating process in which the catalytic activities of a phthalocyanine complex are utilized to effect the desired oxidation of mercaptans to disulfides; etc.

In a preferred embodiment, the catalytic oxidation process utilized in the final sweetening step is the phthalocyanine catalyzed process which will be discussed in detail here, not only because it is preferred for utilization in the present process, but also because we have found a singular improvement of phthalocyanine catalytic stability when the process of the present invention is practiced in conjunction therewith. As hereinbefore mentioned, this improvement is thought by us to be primarily due to removal in the coupling step of surface active agents, such as phenolic materials, which apparently have the capability to block the approach of mercaptide ions to the catalyst.

Any suitable phthalocyanine catalyst may be used in the oxidation step of the present invention and preferably comprises a metal phthalocyanine. Particularly preferred metal phthalocyanines include cobalt phthalocyanine and vanadium phthalocyanine. Other metal phthalocyanines include iron phthalocyanine, copper phthalocyanine, nickel phthalocyanine, chromium phthalocyanine, etc. The metal phthalocyanine, in general, is not readily soluble in aqueous solvents, and therefore, when used in an aqueous alkaline solution, or for ease of combining with a solid carrier, a derivative of the phthalocyanine is preferred. A particularly preferred derivative is the sulfonated derivative. Thus, an especially preferred phthalocyanine catalyst is cobalt phthalocyanine sulfonate. Such a catalyst comprises cobalt phthalocyanine monosulfonate and polysulfonates. Another preferred catalyst comprises vanadium phthalocyanine sulfonate. These compounds may be obtained from any source or prepared in any suitable manner as, for example, by reacting cobalt or vanadium phthalocyanine with 25–50% fuming sulfuric acid. While the sulfonic acid derivatives are preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction, the acid chloride is formed and may be converted to the desired carboxylated derivative by conventional hydrolysis.

Treatment of the hydrocarbon distillate in the presence of the phthalocyanine catalyst preferably is effected in the presence of an alkaline reagent. Any suitable alkaline reagent may be employed. A preferred reagent comprises an aqueous solution of an alkali metal hydroxide such as sodium hydroxide (caustic), potassium hydroxide, etc. Other alkaline solutions include aqueous solutions of lithium hydroxide, rubidium hydroxide, cesium hydroxide, etc., although, in general, these hydroxides are most expensive and, therefore, generally are not preferred for commercial use. Preferred alkaline solutions are aqueous solutions of from about 1% to about 50% and more preferably 5% to 25% by weight concentration of sodium hydroxide or potassium hydroxide. While water is the preferred solvent, it is understood that other suitable solvents may be used including, for example, alcohol, ketone, etc.

When using the phthalocyanine catalyst, air, oxygen or other suitable oxidizing agent is introduced into the reaction zone. In some cases, the hydrocarbon distillate may contain entrained air in a sufficient amount to effect the desired oxidation, but usually it is desirable to introduce extraneous air in order to be sure that sufficient air is present for the desired purpose.

Treating of the hydrocarbon distillate with the phthalocyanine catalyst is effected at any suitable temperature, which may range from ambient to 210° F. when operating at atmospheric pressure, or up to about 400° F. or more when operating at superatmospheric pressure. In general, it is preferred to utilize a slightly elevated temperature which may range from about 100° F. to about 175° F. Atmospheric pressure or super-atmospheric pressure, which may range up to 1000 pounds or more, may be used.

Treatment of the hydrocarbon distillate with the phthalocyanine catalyst is effected in any suitable manner and may be either batch or continuous type of operation. Regardless of which method is used, the phthalocyanine catalyst is employed either as a solution or as a fixed bed. When the catalyst is employed in solution, the amount of catalyst may range from 5 to 1000 parts per million or more preferably from about 20 to about 500 parts per million by weight of the alkaline reagent solution. In one embodiment, the catalyst is prepared as a solution in a suitable solvent including ammoniated water, alcohol, aqueous sodium hydroxide, etc., and then is introduced in this manner to the oxidation zone. In another embodiment, the catalyst is added as such to the oxidation zone, to become dissolved in the alkaline reagent solution therein.

When the catalyst is employed as a fixed bed in the oxidation zone, it is prepared as a composite with a solid support. Any suitable support may be employed and preferably comprises activated charcoal, coke or other suitable forms of carbon. In some cases the support may comprise silica, alumina, magnesia, etc., or mixtures thereof. The solid catalyst is prepared in any suitable manner. In one method, preformed particles of the solid support are soaked in a solution containing the catalyst, after which excess solution is drained off and the catalyst is used as such or is subjected to a drying treatment, mild heating, blowing with air, hydrogen, nitrogen, etc., or successive treatments using two or more of these prior to use. In other methods of preparing the solid composite, a solution of the phthalocyanine catalyst may be sprayed or poured over the particles of the solid support, or such particles may be dipped, suspended, immersed or otherwise contacted with the catalyst solution. The concentration of phthalocyanine catalyst in the composite may range from 0.1% to 10.0% by weight of the composite.

In a typical batch type operation, the sour hydrocarbon distillate, alkaline reagent solution and catalyst are disposed in a reaction zone, and air is bubbled therethrough until the desired oxidation is completed. In a continuous type operation, the sour hydrocarbon distillate, alkaline reagent solution and catalyst, when the latter is employed in dissolved form, are supplied to the oxidation zone, preferably at a lower portion thereof. It is understood that the catalyst and alkaline reagent solution may be introduced to the reaction zone either separately or in admixture, and either commingled with, or separate from the sour hydrocarbon distillate. In a fixed bed continuous process, the catalyst is disposed as a fixed bed in a reaction zone, and the sour hydrocarbon distillate, air and alkaline solution when desired, are passed into the reaction zone, in upward or downward flow, either together, or separately, and simultaneously or intermittently.

Regardless of the particular operation employed, the products are separated to recover treated hydrocarbon distillate of reduced mercaptan content and to separate alkaline reagent solution for reuse in the process. When the soluble catalyst is employed, the catalyst is recovered in admixture with the alkaline reagent solution and is recycled therewith for further use in the process. When desired, additional quantities of phthalocyanine catalyst may be added continuously or intermittently during the treatment of the sour hydrocarbon distillate.

It is to be kept in mind that the exact selection of the particular setting of all of the variables of this process are at least partially dependent on the physical and/or chemical characteristics of the sour organic stream being subjected to the present process and as such have to be individually determined for each particular type of input stream.

The following examples are given to illustrate further the process of the present invention, and to indicate the benefits to be afforded through the utilization thereof. It is understood that the examples are given for the sole purpose of illustration, and are not considered to limit the generally broad scope and spirit of the appended claims.

The diazonium compound used in the following examples was diazotized sulfanilic acid. This material was prepared by the following procedure: Sulfanilic acid was added to water in a ratio of about 7.8 grams per 100 cc. of water. The water had been previously commingled with sodium carbonate in a ratio of about 2.7 grams per 100 cc. of said water. The resultant solution was filtered. A solution of concentrated hydrochloric acid was added in an amount of about 13.5 grams per 100 cc. of solution and, the mixture was cooled to about 20° C. Then the temperature of the mixture was dropped to about 10° C. by immersion in an ice bath. Sodium nitrite then was added slowly to the solution in an amount of about 3.2 grams per 100 cc. of said solution and the temperature of the mixture was controlled such that a level of 15° C. was not exceeded. The procedure resulted in a clear light yellow solution of diazotized sulfanilic acid.

EXAMPLE I 250 cc. of a commercial kerosene having an initial boiling point of about 370° F., an end boiling point of about 500° F., a mercaptan content of 135 p.p.m. and a Saybolt color of about 30 were contacted with 250 cc. of 10% caustic solution containing 100 parts per million of cobalt phthalocyanine sulfonate catalyst. The resultant mixture was maintained at 93° C. to 95° C.; and the time of contact was 12 minutes.

The treated kerosene was separately recovered and was found to contain less than 5 p.p.m. of mercaptan sulfur, but to have a Saybolt color of about 0—in other words, to have a noticeably deep-yellow color—whereas before the test its color was water white.

Another 250 cc. of the same kerosene were treated with a caustic solution of the diazonium compound. This caustic solution was prepared by mixing together 100 cc. of the diazotized sulfanilic acid solution, the preparation of which was described hereinbefore, with 50 cc. of 20% by weight sodium hydroxide solution. A very deep red solution resulted which separated away from the hydrocarbon mixture on standing. The reaction vessel then contained an upper kerosene phase and a lower aqueous caustic phase which had a very deep red color. The kerosene phase was then decanted and treated with 250 cc. of 10% caustic solution containing 100 parts per million of cobalt phthalocyanine sulfonate catalyst. This treatment, once again, was effected in a batch type reactor in which the temperature was maintained within the range of 93° C. to 95° C. The time of contacting was approximately 12 minutes. The treated kerosene was separately recovered and now was found to contain less than 5 p.p.m. of mercaptan sulfur, and to have a Saybolt color of approximately 30, that is to say that it was water white.

From the above data it will be seen that the treatment of the kerosene with the diazotized sulfanilic acid resulted in a product which essentially underwent no color degradation during the subsequent mercaptan oxidation step.

EXAMPLE II

Sour jet fuel is sweetened in a conventional doctor treating process in which the jet fuel is mixed with fresh sodium plumbite solution at ambient temperatures, after which free sulphur is added and the mixing is continued. The reaction mixture then is allowed to settle and the doctor solution is separated from the treated jet fuel. During the course of the treatment it is noted that the jet fuel has undergone a substantial color change, but it has been reduced to acceptable mercaptan content.

Another sample of the same sour jet fuel above, is contacted with a caustic solution of diazotized sulfanilic acid. The resultant mixture is allowed to stand in a settling zone where a phase separation is observed. Each phase is then separately withdrawn, and the jet fuel phase is sweetened in a conventional doctor treating process in which the jet fuel is mixed with fresh sodium plumbite solution at ambient temperatures, after which free sulfur is added and the mixing is continued. The reaction mixture then is allowed to settle and the doctor solution is separated from the treated jet fuel. The jet fuel now is found to be substantially reduced in mercaptan content and also to be of acceptable color.

EXAMPLE III

A sour West Texas kerosene having a mercaptan sulfur content of .15% by weight is admixed with a caustic solution of diazotized sulfanilic acid and the resultant mixture is charged to a reaction zone which contains suitable contacting means which in this case is a fixed bed of inert packing materials. The residence time within the zone for the resultant mixture is approximately 10 minutes. The zone is maintained at a temperature of approximate 35° F. The effluent from said reaction zone is then allowed to settle in a settling zone. The separation is into a hydrocarbon phase and a caustic phase. The caustic phase is then recycled to the coupling reaction zone. The hydrocarbon phase is admixed with 20% by weight caustic solution and is charged to a sweetening zone where it is contacted with air and a cobalt phthalocyanine sulfonate catalyst which is present as a fixed bed on a charcoal support. The temperature of the sweetening zone is maintained at 110° F. and a pressure of 75 p.s.i.g. The effluent products are then passed into a settling zone wherein the kerosene separates from the sodium hydroxide solution. The kerosene is then separately withdrawn and found to have a substantially reduced mercaptan content and to have a water white color.

EXAMPLE IV

This example illustrates the improvement in phthalocyanine catalyst activity that is observed when the process of the present invention is performed using a phthalocyanine catalyzed mercaptan oxidation step.

A sample of a commercial kerosene having an initial boiling point of about 400° F., an end boiling point of about 525° F., mercaptan sulfur content of about 118 parts per million, and a Saybolt color of about 30 is subjected to caustic methanol extraction in order to remove potential catalytic toxins—which includes phenolic materials. Then in order to prepare a control sample that is substantially free from the influence of other potential catalytic toxins but that adequately reflects the impact of phenolic materials, a sample of the caustic-methanol extracted kerosene is admixed with nonylphenol such that the final concentration of nonylphenol is 375 parts per million. It is to be noted that normal kerosene contain phenolic material in a concentration that ranges between 100 p.p.m. to about 500 p.p.m.

250 cc. of the control sample are then treated with 250 cc. of a 10% caustic containing 100 parts per million of cobalt phthalocyanine sulfonate catalyst. The temperature of the mixture is maintained at 93° C. to 95° C. for a time of contact of 20 minutes. The treated kerosene is separately recovered and found to have a mercaptan concentration of about 48 p.p.m. and a Saybolt color of 0.

Another 250 cc. of the same kerosene are, in a preoxidation step, treated with a caustic solution of the diazonium compound. This caustic solution is prepared by mixing together 100 cc. of the diazotized sulfanilic acid solution with 50 cc. of 20% by weight of sodium hydroxide solution. A very deep red solution results which separates away from the hydrocarbon mixture on standing. The kerosene phase is decanted and is treated with 250 cc. of a 10% caustic solution containing 100 parts per million of cobalt phthalocyanine sulfonate catalyst. The reactive mixture is maintained at 93° C. to 95° C. for a time of contact with 20 minutes. The treated kerosene is separately recovered and found to have a mercaptan concentration of 11 p.p.m. and a Saybolt color of 30.

Thus this example clearly manifests the dual effect of the pretreatment step in that, not only as substantial color degradation avoided but also a substantial increase in catalytic activity is experienced.

We claim as our invention:

1. A combination process for treating a sour organic stream containing mercaptan and color forming components in order to generate a product of reduced mercaptan content and of acceptable color, which comprises the steps of:
    (a) treating said sour organic stream with from about .0001% to about 1.0% by weight of an aromatic diazonium compound at a temperature of from about 0° F. to about 100° F. to effect the conversion of a substantial portion of the color forming component of said sour organic stream into a separable azo compound; and,
    (b) subsequently contacting the thus treated organic stream with an oxidizing agent to convert at least a portion of said mercaptan component into disulfide.

2. The combination process of claim 1 further characterized in that said sour organic stream is a hydrocarbon fraction boiling above the gasoline range.

3. The combination process of claim 1 further characterized in that said diazonium compound is selected from the group consisting of benzenediazonium salts and substituted aromatic diazonium salts.

4. The combination process of claim 1 further characterized in that said diazonium compound is a diazotized sulfanilic acid.

5. A combination process for treating a sour hydrocarbon fraction containing mercaptan and phenolic components in order to recover a product of reduced mercaptan content and of acceptable color, which comprises the steps of:
    (a) treating said sour hydrocarbon fraction with from about .0001% to about 1.0% by weight of an aromatic diazonium compound in an alkaline solution at a temperature of from about 0° F. to about 100° F. to effect the conversion of a substantial portion of the phenolic component of said sour hydrocarbon fraction into alkali-soluble azo compound;
    (b) separating the thus treated hydrocarbon fraction containing said alkali-soluble azo compound into a substantially phenolic-component-free hydrocarbon phase and an azo compound-containing alkali phase; and
    (c) contacting said substantially phenolic-component-free hydrocarbon phase with an oxidizing agent and with a phthalocyanine catalyst at a temperature of from ambient to 210° F. to convert at least a portion of the mercaptan component of said phenolic-component-free hydrocarbon phase into disulfide.

6. The combination process of claim 5, further characterized in that said sour hydrocarbon fraction is a fraction boiling above the gasoline range.

7. The combination process of claim 5 further characterized in that said phthalocyanine catalyst is selected from the group consisting of cobalt phthalocyanine sulfonates and vanadium phthalocyanine sulfonates.

8. The combination process of claim 5 further characterized in that said diazonium compound is selected from the group consisting of benzenediazonium salts and substituted aromatic diazonium salts.

9. The combination process of claim 5 further characterized in that said diazonium compound is a diazotized sulfanilic acid.

10. The combination process of claim 5, further characterized in that said phenolic-component-free hydrocarbon phase is reacted with an oxidizing agent in the presence of an alkaline solution, and in contact with a phthalocyanine catalyst.

References Cited
UNITED STATES PATENTS

| | | | |
|---|---|---|---|
| 2,092,739 | 9/1937 | Van Dijck | 208—289 |
| 2,975,136 | 3/1961 | Thomas et al. | 208—289 |
| 3,097,158 | 7/1963 | Gleim | 208—206 |
| 3,123,549 | 3/1964 | Ayers et al. | 208—289 |

DELBERT E. GANTZ, *Primary Examiner.*

G. J. CRASANAKIS, *Assistant Examiner.*